United States Patent [19]

Nishi et al.

[11] Patent Number: 4,628,467

[45] Date of Patent: Dec. 9, 1986

[54] VIDEO DISPLAY CONTROL SYSTEM

[75] Inventors: Kazuhiko Nishi; Takatoshi Ishii; Ryozo Yamashita, all of Tokyo; Shigemitsu Yamaoka, Hamamatsu; Takatoshi Okumura, Hamamatsu; Minoru Morimoto, Hamamatsu, all of Japan

[73] Assignees: Ascii Corporation, Tokyo; Nippon Gakki Seizo Kabushiki Kaisha, Hamamatsu, both of Japan

[21] Appl. No.: 735,370

[22] Filed: May 17, 1985

[30] Foreign Application Priority Data

May 18, 1984 [JP] Japan ................................. 59-100302

[51] Int. Cl.⁴ ..................... G06F 15/62; G09G 1/02; G09G 1/28
[52] U.S. Cl. .................................. 364/521; 364/900; 340/703; 340/799
[58] Field of Search ........ 364/521, 523, 200 MS File, 364/900 MS File; 340/701, 703, 720, 799; 358/78, 903

[56] References Cited

U.S. PATENT DOCUMENTS 4,149,152  4/1979  Russo ................................. 340/703
4,511,965  4/1985  Rajaram ........................... 340/703 X
4,574,277  3/1986  Krause et al. ....................... 340/703

FOREIGN PATENT DOCUMENTS 35367  3/1983  Japan ................................. 364/521
155448  9/1983  Japan ................................. 364/521

OTHER PUBLICATIONS

Boisvert, Conrad J., "Doubling the Character Rate Handled by CRT Controllers", *Electronics*, vol. 52, No. 21, Oct. 11, 1979, pp. 155–157.

Myers, Ware, "Computer Graphics: Reaching the User", *Computer*, vol. 19, No. 3, Mar. 1981, pp. 7–17.

*Primary Examiner*—William B. Perkey
*Attorney, Agent, or Firm*—Cushman, Darby & Cushman

[57] ABSTRACT

A video display control system comprises a video display processor (VDP) which is capable of accessing to a video RAM (VRAM) at an extremely high-speed. The VRAM used in this system comprises first and second dynamic RAMs each having an address input terminal to which row address data and column address data are supplied, a row address strobe input terminal, a column address strobe input terminal, and a data input-/output terminal. The row address data is latched at the leading edge of a row address strobe signal applied to the row address strobe input terminal, while the column address data is latched at the leading edge of a column address strobe signal applied to the column address strobe input terminal. An access to an address of each dynamic RAM is established when both of the row and column address data are latched. The VDP comprises a VRAM interface for controlling an access to the first and second dynamic RAMs which is connected to the RAMs through a common address bus. The VRAM interface first outputs row address data together with a row address strobe signal $\overline{RAS}$ and then outputs column address data together with two column address strobe signals $\overline{CAS0}$ and $\overline{CAS1}$ which are rendered active in sequence and supplied to the first and second dynamic RAMs, respectively.

3 Claims, 11 Drawing Figures

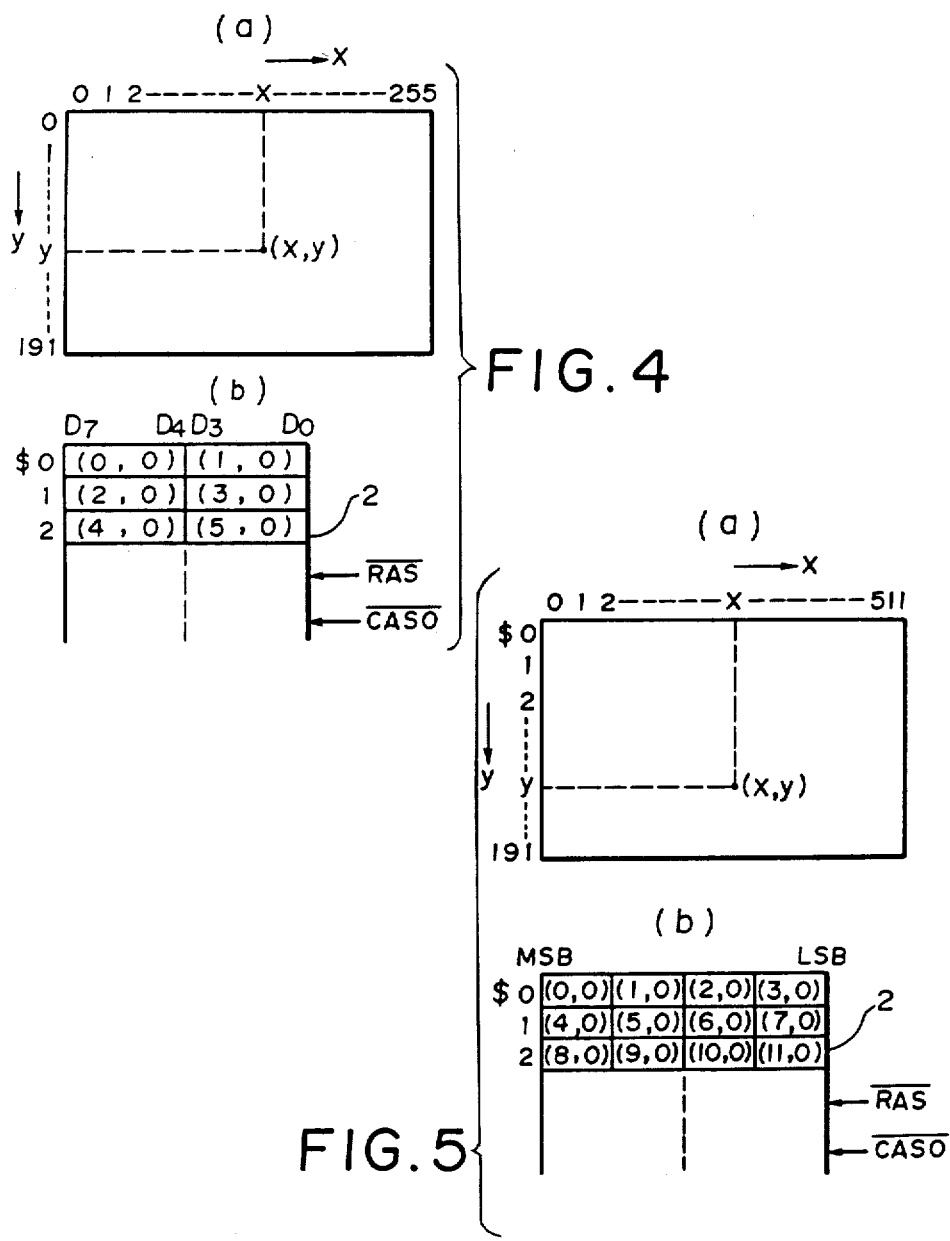

VIDEO DISPLAY CONTROL SYSTEM

BACKGROUND OF THE INVENTION

1. Field of the Invention

The present invention relates to a video display control system for use in terminal equipment for a computer, television game apparatus or the like.

Recently, various kinds of display control systems which display animation and still images on a screen of a CRT (cathode-ray tube) display unit under the control of a CPU (central processing unit) have been developed. FIG. 1 shows one example of such conventional systems which comprises a video display processor (hereinafter referred to as "VDP") 101 and a central processing unit (CPU) 102. The system further comprises a memory 103 which includes a ROM (read only memory) for storing a variety of programs to be executed by the CPU 102 and a RAM (random access memory) for storing other necessary data. The CPU 102 outputs data representative of still and animation images to be displayed on a screen of a CRT display unit 105 to the VDP 101 which in turn stores the still and animation data into a video RAM (hereinafter referred to as "VRAM") 104.

Upon receipt of a display command from the CPU 102, the VDP 101 sequentially reads the still and animation data from the VRAM 104 in accordance with scanning synchronization signals of the CRT display unit 105, and supplies the read data to the CRT display unit 105, thereby the still and animation images being displayed on the screen of the CRT display unit 105.

In such a display control system, when the number of display elements or dots on the display screen is increased to improve the quality of a display image or when the number of bits of each color code is increased to increase the number of colors available, the quantity of data stored in the VRAM is also increased. As a result, the large quantity of data must be read from or write into the VRAM at a speed corresponding to the display speed so that the VDP must establish accesses to the VRAM at an extremely high speed.

However, in the conventional video display control systems, any particular means for making a high speed access to the VRAM have not been provided, so that it has been difficult to improve the quality of display image and to increase the number of colors available. In addition, in case of performing the access at a high speed, it has been necessary to use as the VRAM a DRAM (dynamic RAM) having a high access speed. However, such a DRAM is generally expensive.

SUMMARY OF THE INVENTION

It is an object of the present invention to provide a video display control system in which an access to a VRAM can be made at an extremely high speed even when a DRAM having a low access speed is used as the VRAM.

According to the present invention, there is provided a video display control system adapted to be connected to a video display unit for displaying a video image on a screen of the video display unit comprising (a) first and second memory means for storing image data representative of the video image, each of the first and second memory means having (i) a plurality of addresses, (ii) a data input/output terminal, (iii) an address input terminal, (iv) row and column address strobe input terminals, (v) row address latch means responsive to a row strobe signal applied to the row address strobe input terminal for latching row address data applied to the address input terminal, and (vi) column address latch means responsive to a column strobe signal applied to the column address strobe input terminal for latching column address data applied to the address input terminal, the row and column address data latched by both of the row and column address latch means determining one of the plurality of addresses with which transfer of data is made through the data input/output terminal, the data input/output terminal being in a high-impedance state when no signal is applied to the column address strobe input terminal; (b) display control means having (i) an address bus connected to both of the address input terminals of the first and second memory means, (ii) a data bus connected to both of the data input/output terminals of the first and second memory means, (iii) access control means for outputting row address data of a selected one of the plurality of addresses onto the address bus and for feeding a row address strobe signal to both of the row address strobe input terminals of the first and second memory means, the access control means subsequently outputting column address data of the selected address onto the address bus and feeding alternatively first and second column address strobe signals to the column address strobe input terminal of the first memory means and the column address strobe input terminal of the second memory means, respectively, whereby the display control means establishing an access to the selected address of each of the first and second memory means so that transfer of data with the selected addresses is effected through the data bus. The image data may be composed of a plurality of color codes for designating colors of display elements of the display image. In this case, the display control means may further comprise reading means connected to the data bus and cooperative with the access control means for sequentially reading the color codes from the accessed addresses of the first and second memory means, the reading means outputting each of the read color codes to the video display unit in synchronization with scanning of the screen of the video display unit, whereby each display element of the display image is displayed on the screen in a color designated by a respective one of the read color codes.

BRIEF DESCRIPTION OF THE DRAWINGS

FIG. 4 is an illustration showing the relation between display elements on the screen and the corresponding color codes stored in the VRAM 2 in G IV mode;

FIGS. 5, 6 and 7 are illustrations similar to FIG. 4 but showing such relations in G V mode, G VI mode and G VII mode, respectively;

DESCRIPTION OF THE PREFERRED EMBODIMENT OF THE INVENTION

Figure 2:
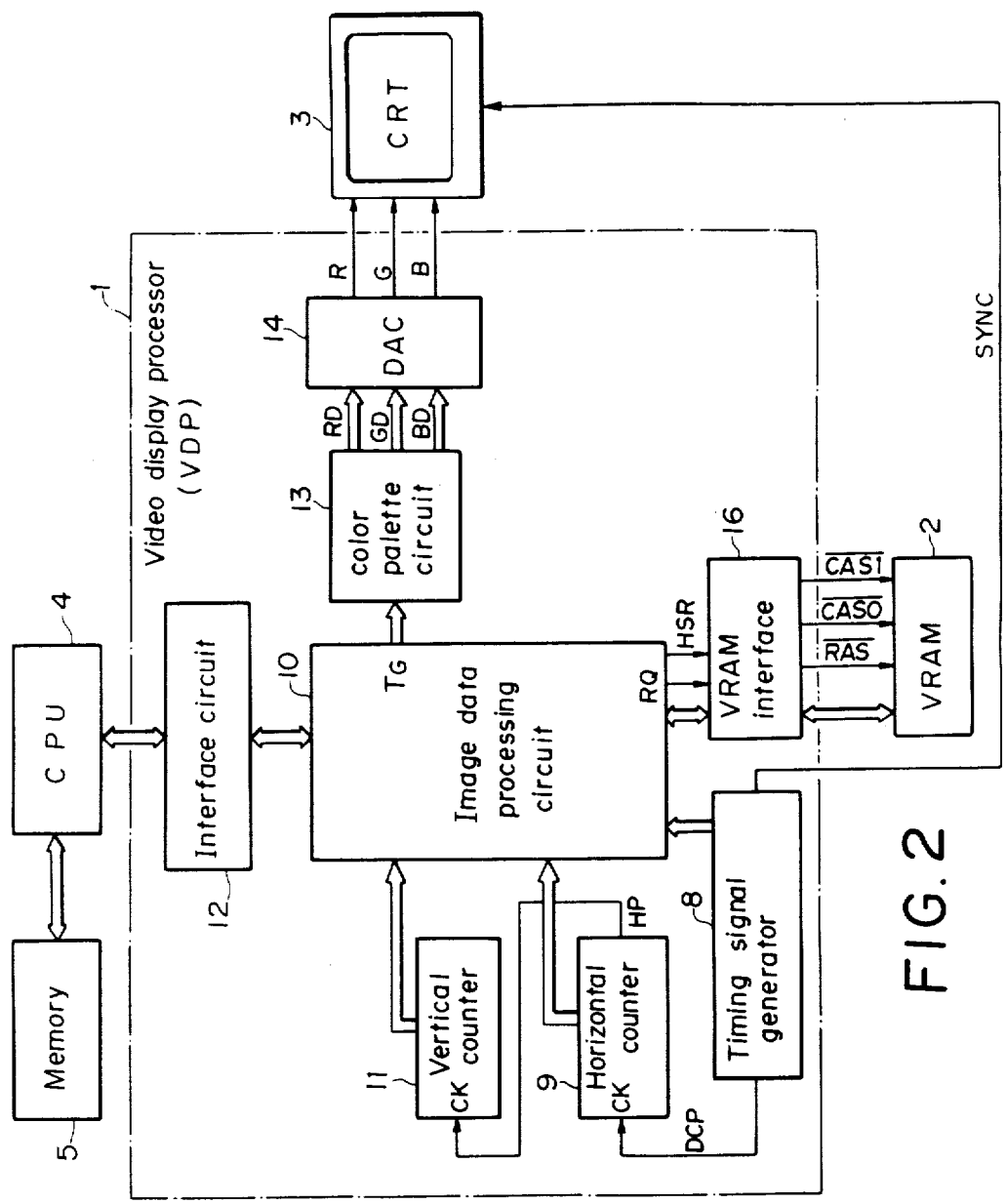
FIG. 2 is a block diagram of a video display control system provided in accordance with the present invention.

Shown in FIG. 2 is a video display control system provided in accordance with the present invention. This system comprises a video display processor (hereinafter, referred to as "VDP") which causes an animation and a still image to be displayed on a screen of a CRT display unit 3 in accordance with imaga data stored in a VRAM (video RAM) 2. Also, the VDP 1 allows the contents of the VRAM 2 to be changed and causes a part of the contents of the VRAM 2 to be transferred to the outside in accordance with various kinds of commands or image data supplied from a CPU (central processing unit) 4. A memory 5 stores programs to be executed by the CPU 4 and also stores various kinds of image data.

The VDP 1 will now be more fully described.

A timing signal generator 8 shown in FIG. 2 generates a reference clock pulse by means of a X'tal oscillator provided therein, and generates, in accordance with the reference clock pulse, a dot clock pulse DCP and a synchronization signal SYNC. The dot clock pulse DCP is outputted to a clock terminal CK of a horizontal counter 9, while the synchronization signal SYNC is outputted to the CRT display unit 3. The dot clock pulse DCP corresponds to each display element displayed on the CRT display screen, in other words, the dot clock pulse DCP is synchronized with a display timing of each of display elements which are sequentially displayed on the screen in accordance with the horizontal scanning of the screen. The timing signal generator 8 also generates various kinds of timing signals necessary for processing the image data and outputs them to an image data processing circuit 10.

The horizontal counter 9 is reset when each horizontal scan of the screen is started, and each time when a predetermined number of dot clock pulses DCP are counted, the horizontal counter 9 outputs a signal HP to a clock terminal CK of a vertical counter 11. The vertical counter 11 is reset each time the vertical scan of the screen is started, so that the content of the vertical counter 11 represents the sequential number of the scanning line which is being scanned by an electron beam.

The image data processing circuit 10 sequentially stores the image data (still image data and animation image data), which are supplied from the CPU 4 through an interface circuit 12, into respective table areas of the VRAM 2. After completion of the storage of the image data into the VRAM 2, and when a display command is outputted from the CPU 4, the image data processing circuit 10 performs the display of the still and animation images in accordance with each image data in the VRAM 2. The display of the images is performed by reading out color codes, which are the codes designating colors of display elements to be displayed and constitute the still image and animation image data, from the VRAM 2 in accordance with the scanning position of the electron beam indicated by the contents of the horizontal counter 9 and vertical counter 11, and by outputting those color codes (each composed of 2, 4 or 8 bits) from a terminal TG thereof. Incidentally, in the case where the animation image and the still image are located at the same display position on the screen, the animation image is preferentially displayed, so that the animation image is displayed in front of the still image.

A color palette circuit 13 is a kind of code converter and converts each color code of 2, 4 or 8 bits to red color data RD, green color data GD and blue color data BD (each of these color data consists of three bits) and outputs them to a DAC (digital-to-analog converter) 14. The DAC 14 converts the color data RD, GD and BD into analog color signals R, G and B, respectively, and then outputs these color signal R, G and B to the CRT display unit 3. A VRAM interface 16 controls the transfer of data between the image data processing circuit 10 and the VRAM 2. The VRAM interface 16 is constructed so as to output at a proper timing a row address strobe signal $\overline{RAS}$ and column address strobe signals $\overline{CAS0}$ and $\overline{CAS1}$ to the VRAM 2 in response to a VRAM access request signal RQ and a high-speed read signal HSR both outputted from the image data processing circuit 10. After outputting the signal $\overline{RAS}$, the VRAM interface 16 outputs either one of the signal $\overline{CAS0}$ or the $\overline{CAS1}$ when the access request signal RQ is supplied but when the signal HSR is not supplied. On the other hand, when the signal HSR is supplied together with the signal RQ, the VRAM interface 16 sequentially outputs the signals $\overline{CAS0}$ and $\overline{CAS1}$ after outputting the signal $\overline{RAS}$.

A still image display mode of this system will now be described (the animation image display is not directly concerned with the spirit of the present invention; therefore, its description is omitted).

The still image mode of this system includes a dot map mode in which colors of the display elements constituting the entire display screen can be disignated individually. This dot map mode includes four kinds of display modes, namely, G IV, G V, G VI, and G VII modes.

Each of those display modes will now be described.

(1) G IV and G V modes

In the G IV and G V modes, each color code is composed respectively of four bits and two bits and the screen is constituted respectively by 256×192 display elements and 512×192 display elements (refer to FIGS. 4 and 5). Storage area of the VRAM 2 in these modes is formed by a single dynamic RAM, each address of which consists of eight bits. In these display modes G IV and G V, color codes are stored in the orders shown in FIGS. 4-(b) and 5-(b), respectively. In this case, the VRAM 2 latches a row address when the signal $\overline{RAS}$ is supplied and latches a column address when the signal $\overline{CAS0}$ is supplied. And the address to be accessed is determined when both signals $\overline{RAS}$ and $\overline{CAS0}$ have been supplied.

(2) G VI mode

Figure 6:
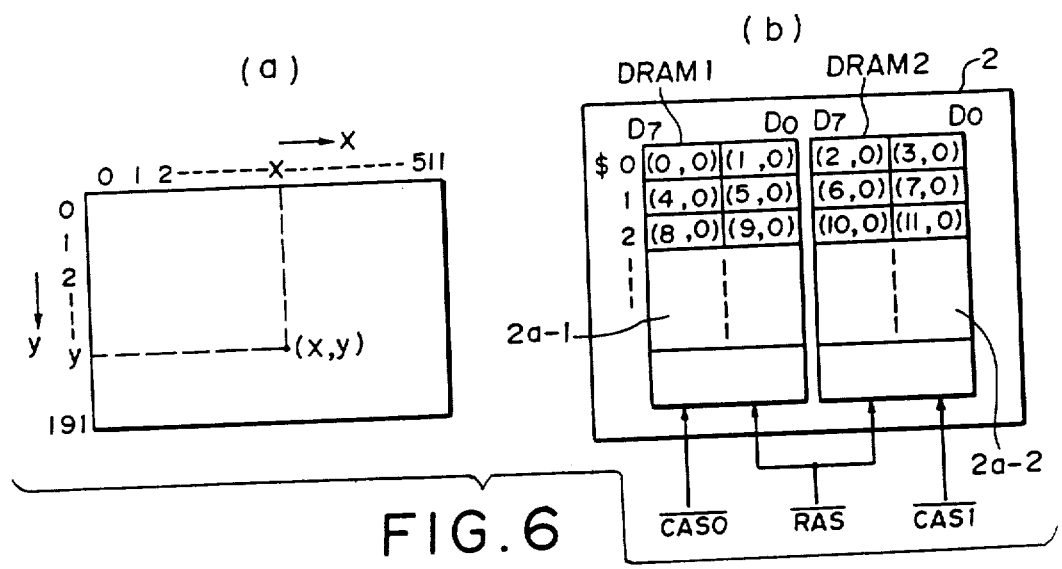

In this mode, as shown in FIG. 6-(a), the screen is constituted by 512×192 display elements and each color code is composed of four bits similarly to the G IV mode. In this G VI mode, storage area of the VRAM 2 is formed by two dynamic RAMs DRAM1 and DRAM2 as shown in FIG. 6-(b). Color codes corresponding to all display elements on the display screen are stored into still image data areas 2a-1 and 2a-2 provided respectively in the DRAM1 and DRAM2 in the order shown in FIG. 6-(b). In this case, the DRAM1 and DRAM2 are arranged so as to have the same addresses.

(3) G VII mode

Figure 7:
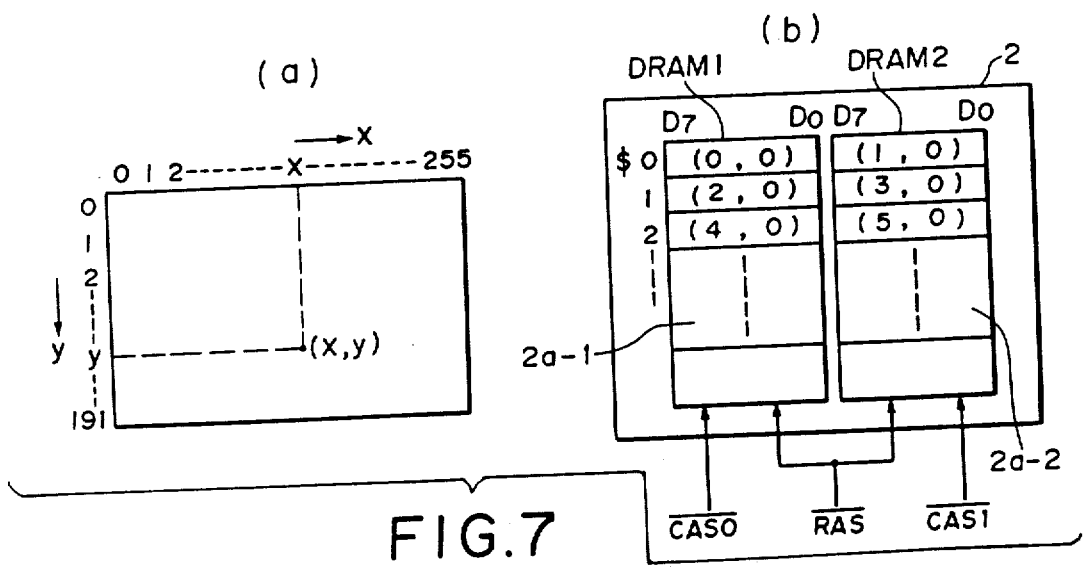

In this mode, each color code consists of eight bits and 256 colors can be designated for one display element on the display screen. The screen is constituted by 256×192 display elements as shown in FIG. 7-(a). Storage area of the VRAM 2 in this G VII mode is formed by the DRAM1 and DRAM2 which are set into the same address range similarly to the foregoing G VI mode (refer to FIG. 6-(b). Color codes are stored into the still image data areas 2a-1 and 2a-2 of the DRAM1 and DRAM2 in the order shown in FIG. 7-(b). In this G VII mode and in the foregoing G VI mode, the DRAM1 and DRAM2 latch a row address when the signal $\overline{RAS}$ is supplied. Also, the DRAM1 latches a column address when the signal $\overline{CAS0}$ is supplied, while the DRAM2 latches a column address when the signal $\overline{CAS1}$ is supplied.

Figure 3:
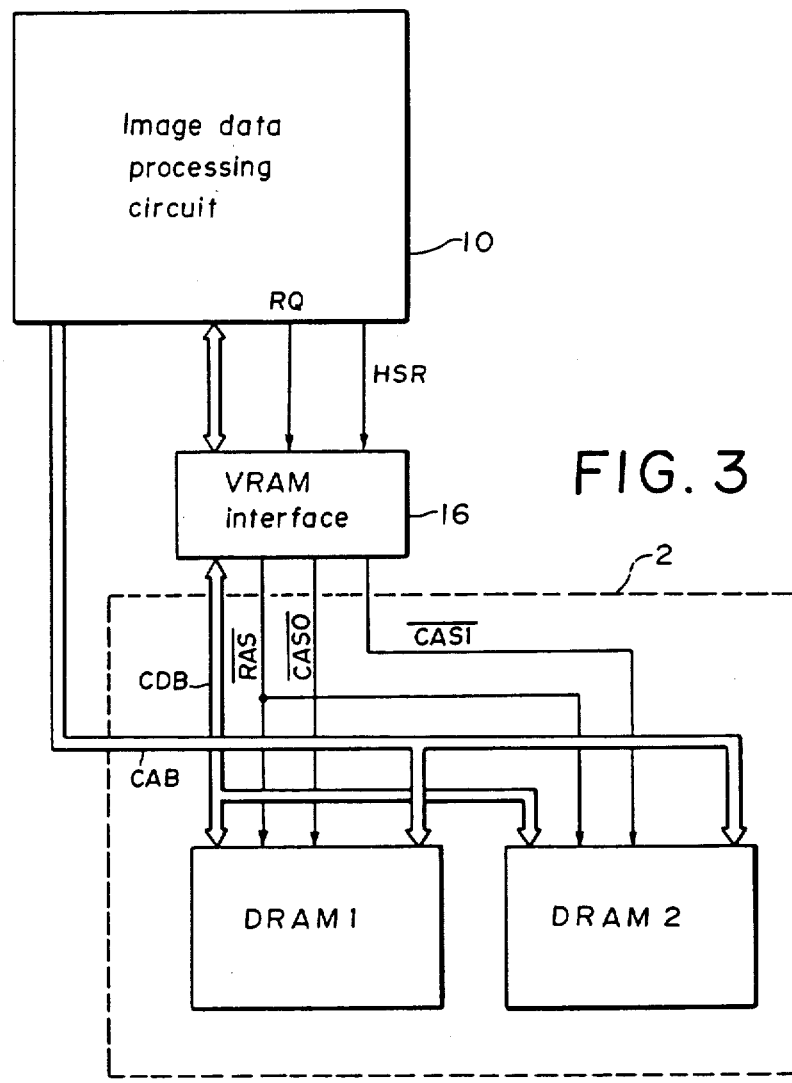
FIG. 3 is a block diagram of a VRAM 2 of the system of FIG. 2 in which the connection of signal lines between the VRAM 2 and the image data processing circuit 10 is shown.

The connection of signal lines of the DRAM1 and DRAM2 to the VRAM interface 16 in the G VI and G VII modes will now be described in detail with reference to FIG. 3.

A signal bus shown at CAB is a common address bus. Each address input terminal of the DRAM1 and DRAM2 is connected to this common address bus CAB, and row address data and column address data are alternately outputted from the image data processing circuit 10 onto the common address bus CAB. Shown at CDB is a common data bus, to which each data input/output terminal of the DRAM1 and DRAM2 is connected. In this case, the transfer of data between the image data processing circuit 10 and the DRAM1 and DRAM2 is carried out through the VRAM interface 16 and the common data bus CDB. The signal $\overline{RAS}$, which is outputted from the VRAM interface 16, is supplied to both of the DRAM1 and DRAM2. On the other hand, the signal $\overline{CAS0}$ is supplied only to the DRAM1 and the signal $\overline{CAS1}$ is supplied only to the DRAM2. Each of the DRAM1 and DRAM2 latch a row address at the leading edge of the signal $\overline{RAS}$, and they latch corresponding column addresses at the leading edges of the signals $\overline{CAS0}$ and $\overline{CAS1}$, respectively. The DRAM1 and DRAM2 perform the inputting and outputting of data when the signals $\overline{CAS0}$ and $\overline{CAS1}$ are at "0" levels, respectively, and they bring the respective data input/output terminals into high impedance state when the signals $\overline{CAS0}$ and $\overline{CAS1}$ become "1" levels, respectively. More specifically, when the signals $\overline{CAS0}$ and $\overline{CAS1}$ are at "1" levels, the DRAM1 and DRAM2 electrically disconnect the respective data input/output terminals from the common data bus CDB. In this embodiment, as described above, the VRAM interface 16 sequentially renders the signals $\overline{CAS0}$ and $\overline{CAS1}$ "0" and in this case the signal $\overline{CAS1}$ is brought into a "0" level after the signal $\overline{CAS0}$ has resumed a "1" level. Therefore, both data of the DRAM1 and DRAM2 never exist on the common data bus CDB at the same time.

The operation of this embodiment will be described.

First, the operation in the G IV and G V modes will be described. The number of bits of a still image data which are read out from the VRAM 2 during one horizontal scanning is 1024 (4 bits×256=1024 bits) in the G IV mode, and is also 1024 (2 bits×512=1024 bits) in the G V mode. In other words, in any of those modes, it is necessary to read out 1024 bits (128 bytes) of data. In the case of reading out the still image data of about 128 bytes during one horizontal scanning, it is not necessary to provide an extremely high access speed, and therefore, an access to the VRAM 2 similar to that in the conventional apparatus is performed. More specifically, the image data processing circuit 10 calculates each address of the VRAM 2, in which color codes necessary for displaying a still image are stored, in accordance with the contents of the horizontal and vertical counters 9 and 11. Then, the image data processing circuit 10 sequentially outputs the row address and column address corresponding to the calculated address to the VRAM 2. At the same time, the VRAM interface 16 sequentially outputs the row address strobe signal $\overline{RAS}$ and column address strobe signal $\overline{CAS0}$ to the VRAM 2. As a result, an access to the address of the VRAM 2 are established, so that the color codes are read from the address and supplied through the VRAM interface 16 to the image data processing circuit 10.

Figure 10:
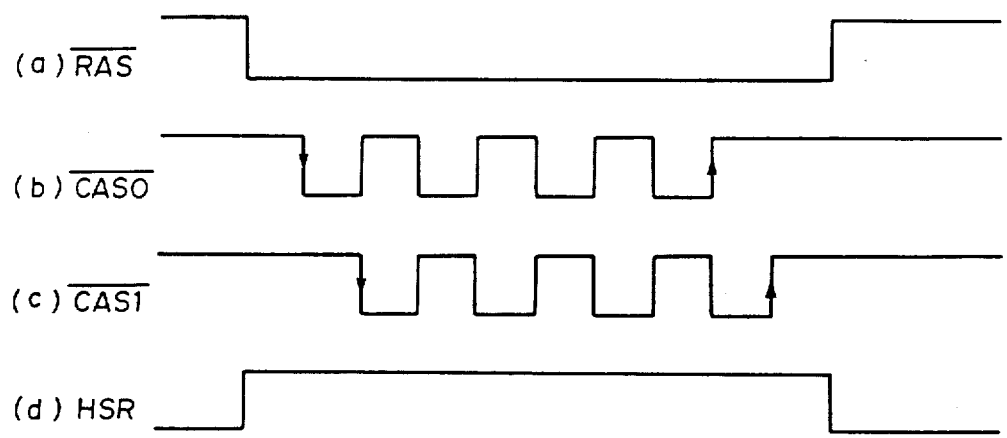
FIGS. 9 and 10 are time charts of the signals $\overline{RAS}$, $\overline{CAS0}$, $\overline{CAS1}$ and HSR in the G VI mode and G VII mode, respectively.
Figure 1:
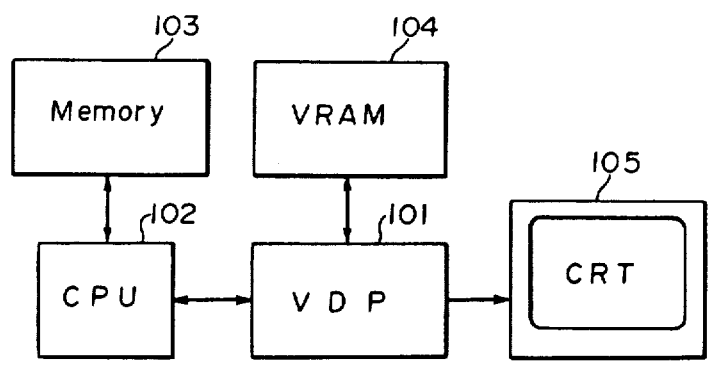
FIG. 1 is a block diagram of a conventional video display control system.
Figure 8:
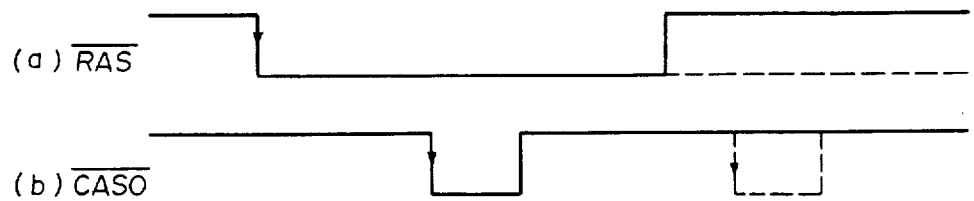
FIG. 8 is a time chart of the signals $\overline{RAS}$ and $\overline{CAS0}$ in the G IV and G V modes.

FIGS. 8-(a) and 8-(b) show the signals $\overline{RAS}$ and $\overline{CAS0}$ which are outputted from the VRAM interface 16 in the foregoing case. As shown in FIGS. 8-(a) and 8-(b), when the access request signal RQ is outputted from the image data processing circuit 10, the VRAM interface 16 first outputs the signal $\overline{RAS}$ and outputs the signal $\overline{CAS0}$ after an expiration of a predetermined time. The VRAM 2 latches the row address at the leading edge of the signal $\overline{RAS}$ and latches the column address at the leading edge of the signal $\overline{CAS0}$. After an elapse of a predetermined time period from the leading edge of the signal $\overline{CAS0}$, the VRAM 2 outputs the color code data (two color codes in case of the G IV mode and four color codes in case of the G V mode) from the accessed address. Then, the VRAM interface 16 stops the output of the signals $\overline{CAS0}$ and $\overline{RAS}$. And thereafter, each time the image data processing circuit 10 outputs new address data, the VRAM interface 16 performs an operation similar to the above operation. In this case, if the row address of each of the addresses to be accessed does not change, the output of the signal $\overline{RAS}$ is held as indicated by a broken line in FIG. 8-(a) and the signal $\overline{CAS0}$ is outputted each time a new column address is outputted from the image data processing circuit 10. This embodiment is arranged so that four successive accesses to the VRAM 2 are performed at once, and therefore, the output of the signal $\overline{CAS0}$ is actually repeated four times as shown in FIG. 10-(b).

In the G IV mode, the image data processing circuit 10 first supplies the upper four bits of the color code data read from the VRAM 2 to the color palette circuit 13 and then supplies the lower four bits of the same color code data to the color palette circuit 13. On the other hand, in the G V mode, the image data processing circuit 10 sequentially supplies four color codes contained in the read color code data to the color palette circuit 13 from the uppermost two bits on a two-bit unit basis.

The operation of this system in the G VI and G VII modes will now be described. In these modes, the number of bits of a still image data which are read out from the VRAM 2 during one horizontal scanning is 2048 (four bits×512=2048 bits) in the G VI mode, and is also 2048 (eight bits×256=2048 bits) in the G VII mode. Thus, in any of those modes, it is necessary to read out 2048 bits (256 bytes). To read out the still image data of about 256 bytes for displaying display elements on one horizontal scanning line, it is necessary to provide an extremely high-speed access to the VRAM 2. In this embodiment, the high-speed access is realized due to the processing which will be described below.

When making an access to the VRAM 2, the image data processing circuit 10 outputs both of the access request signal RQ and high speed read signal HSR to the VRAM interface 16 and also outputs a row address data onto the common address bus CAB. Subsequently, the VRAM interface 16 outputs the signal $\overline{RAS}$ (FIG. 9-(a)), and both of the DRAM1 and DRAM2, which constitute the VRAM 2, latch the row address at the leading edge of the signal $\overline{RAS}$. When the image data processing circuit 10 outputs the column address data and when the VRAM interface 16 outputs the signal $\overline{CAS0}$ (FIG. 9-(b)), an access to the address of the DRAM1 is established at the leading edge of this signal $\overline{CAS0}$. As a result, the color code data (one byte) in the accessed address is read out and outputted onto the common data bus CDB during the time when the signal $\overline{CAS0}$ is "0". The data on this common data bus CDB is supplied to the image data processing circuit 10 through the VRAM interface 16. Subsequently, the VRAM interface 16 renders the signal $\overline{CAS0}$ high and immediately after that, it outputs the signal $\overline{CAS1}$. When the signal $\overline{CAS0}$ is rendered high, the data input/output terminal of the DRAM1 becomes high-impedance state so that the common data bus CDB and the DRAM1 are electrically disconnected from each other and the common data bus CDB becomes idle state. The access to the address of the DRAM2 is established at the leading edge of the signal $\overline{CAS1}$ and the color code data (one byte) in the accessed address is read and outputted onto the common data bus CDB which had been in the idle state. Next, the image data processing circuit 10 reads the data on the common data bus CDB, and then, the VRAM interface 16 renders the signal $\overline{CAS1}$ high. The data input/output terminal of the DRAM2 becomes high impedance state when the signal $\overline{CAS1}$ becomes high, so that the DRAM2 and the common data bus CDB are electrically disconnected from each other, and the common data bus CDB again becomes idle state. Then, the VRAM interface 16 renders the signal $\overline{RAS}$ high, thereby a series of accessing processing being completed.

Figure 9:
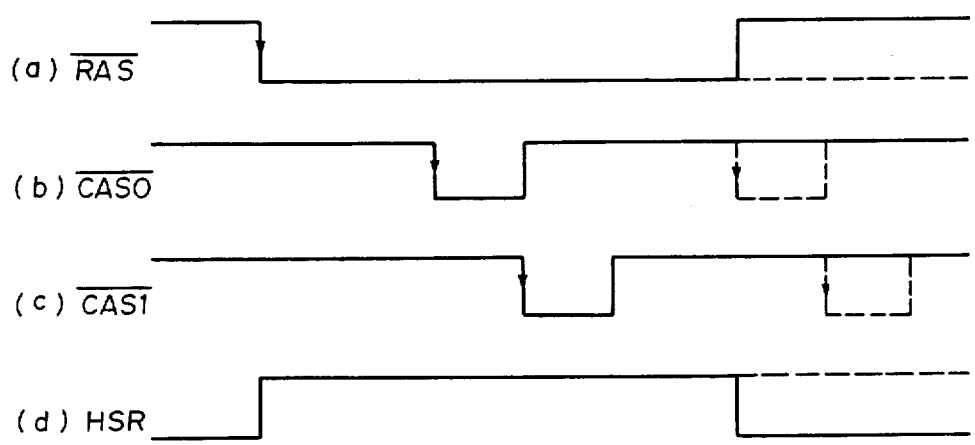

In the case where the row address of each of the addresses to be accessed does not change, the output of the signals $\overline{RAS}$ and HSR may be kept active as indicated by broken lines in FIGS. 9-(a) and 9-(d), and each time a new column address is outputted from the image data processing circuit 10, the signals $\overline{CAS0}$ and $\overline{CAS1}$ are outputted at timings shown in, for example, FIGS. 9-(b) and 9-(c). Actually however, in this embodiment as described before, four successive accesses to the VRAM 2 are performed at once, and therefore, each control signal in this mode becomes as shown in FIG. 10. More specifically, the signals $\overline{CAS0}$ and $\overline{CAS1}$ alternately and repeatedly become "0" level four times. In this case, during the time when one of the signals $\overline{CAS0}$ and $\overline{CAS1}$ is inactive, the other of the column address strobes is made active, thereby realizing the readout of the data which is twice as much as that performed in the ordinary readout within the same time period.

Figure 11:
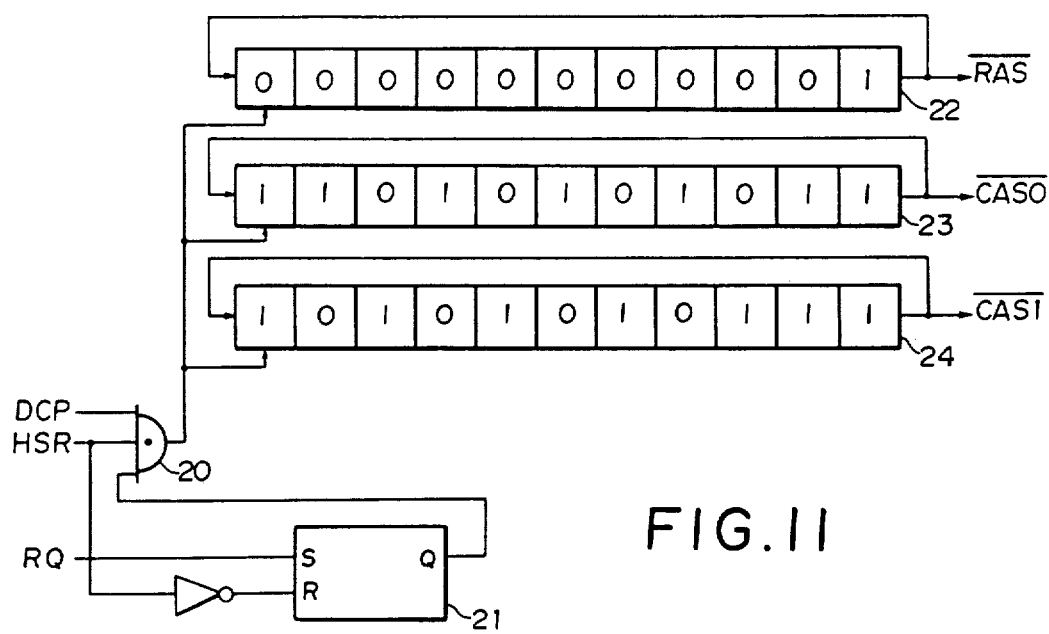
FIG. 11 is a circuit diagram of the VRAM interface 16 of the video display processor 1 of FIG. 1.

FIG. 11 shows a circuit of the VRAM interface 16 which operates in a manner described above. The circuit comprises an AND gate 20, an R-S flip-flop 21 in which priority is given to its set operation, and three eleven-stage shift registers 22 to 24 driven by an output of the AND gate 20. The dot clock pulse DCP and the signal HSR are supplied to first and second input terminals of the AND gate 20, respectively. Third input terminal of the AND gate 20 is supplied with an set output of the R-S flip-flop 21 which is set by the signal RQ and is reset by an inverted signal of the signal HSR. Data "00000000001" is initially loaded into the shift register 22, and in a similar manner, data "11010101011" and "10101010111" are initially loaded into the shift registers 23 and 24, respectively. When the signals RQ and HSR are rendered "1", the R-S flip-flop 21 is set so that the AND gate 20 outputs the dot clock pulse DCP as a shift pulse signal to the shift registers 22 to 24. As a result, the respective outputs of the shift registers 22, 23 and 24, i.e., the signals $\overline{RAS}$, $\overline{CAS0}$ and $\overline{CAS1}$, varies as shown in FIGS. 10-(a), 10-(b) and 10-(c), respectively.

As described above, according to the foregoing accessing processing, an access to the VRAM can be performed about two times as much as that performed according to the conventional processing (FIG. 8) within the same time period. Furthermore, the access time which is required for each of the DRAM1 and DRAM2 may be similar to the access time required in the conventional systems so that there is no need to use a DRAM having a high access speed.

The image data processing circuit 10 supplies the color code data read from the DRAM1 to the color palette circuit 13 in the order of the upper four bits and the lower four bits in the G VI mode, and then supplies the color code data read from the DRAM2 to the color palette circuit 13 in the order of the upper four bits and the lower four bits. On the other hand, in the G VII mode, the image data processing circuit 10 first supplies the color code (eight bits) read from the DRAM1 to the color palette circuit 13 and then supplies the color code read from the DRAM2 to the color palette circuit 13.

As described above, with the structure of the above embodiment, a high-speed access to the VRAM 2 can easily be established without using a dynamic RAM having a high-speed access time. As a result, improvement of quality of display image and increase of colors available can be achieved with minor modification of the hardware and without the increase of costs.

What is claimed is:

1. A video display control system adapted to be connected to a video display unit for displaying a video image on a screen of the video display unit comprising:
   (a) first and second memory means for storing image data representative of the video image, each of said first and second memory means having (i) a plurality of addresses, (ii) a data input/output terminal, (iii) an address input terminal, (iv) row and column address strobe input terminals, (v) row address latch means responsive to a row strobe signal applied to said row address strobe input terminal for latching row address data applied to said address input terminal, and (vi) column address latch means responsive to a column strobe signal applied to said column address strobe input terminal for latching column address data applied to said address input terminal, said row and column address data latched by both of said row and column address latch means determining one of said plurality of addresses with which transfer of data is made through said data input/output terminal, said data input/output terminal being in a high-impedance state when no signal is applied to said column address strobe input terminal;
   (b) display control means having (i) an address bus connected to both of said address input terminals of said first and second memory means, (ii) a data bus connected to both of said data input/output terminals of said first and second memory means, (iii) access control means for outputting row address data of a selected one of said plurality of addresses onto said address bus and for feeding a row address strobe signal to both of said row address strobe input terminals of said first and second memory means, said access control means subsequently outputting column address data of said selected address onto said address bus and feeding alternatively first and second column address strobe signals to said column address strobe input terminal of said first memory means and said column address strobe input terminal of said second memory means, respectively, whereby said display control means establishing an access to said selected address of each of said first and second memory means so that transfer of data with said selected addresses is effected through said data bus.

2. A video display control system according to claim 1, wherein the video image is composed of a plurality of display elements, the image data comprising a plurality of color codes each designating a color of at least one of said display elements, each address of said first and second memory means storing at least one color code, said plurality of color codes being sequentially and alternatively stored in said addresses of said first and second memory means.

3. A video display control system according to claim 2, wherein said display control means further comprises reading means connected to said data bus and cooperative with said access control means for sequentially reading said color codes from said addresses of said first and second memory means, said reading means outputting each of said read color codes to the video display unit in synchronization with scanning of the screen of the video display unit, whereby each display element of said display image is displayed on the screen in a color designated by a respective one of said read color codes.

* * * * *